Patented June 10, 1952

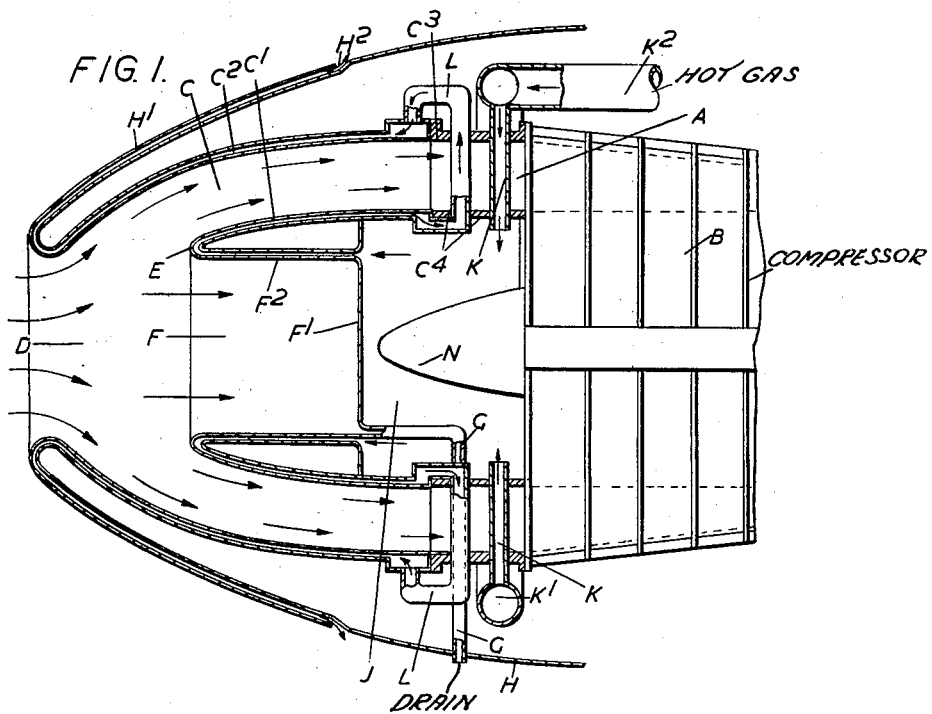
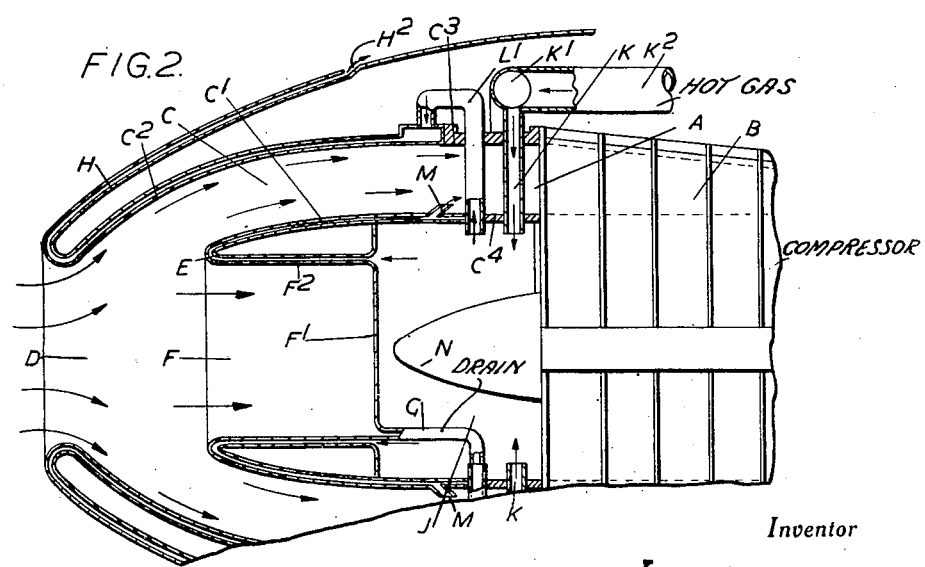
Inventor
JOHN KINSELLA
BY Emery Holcombe & Blair
Attorneys

2,600,302

UNITED STATES PATENT OFFICE 2,600,302

AIR CLEANING INTAKE FOR GAS TURBINES AND OTHER INTERNAL-COMBUSTION ENGINES

John Kinsella, Luton, England, assignor to D. Napier & Son Limited, London, England, a British company Application September 7, 1949, Serial No. 114,329
In Great Britain October 21, 1948

7 Claims. (Cl. 60—39.09)

This invention relates to air intakes for gas turbines and other internal combustion engines of the kind including an annular air inlet passage which, in the case of a combustion turbine, leads to the first stage of the air compressor and, in the case of an internal combustion engine driving a propeller, may surround the propeller shaft and be formed in a so-called ducted spinner in which the boss of the propeller is housed.

The object of the invention is to provide an improved air intake of the kind in question which will provide a forwardly facing air inlet orifice so as to take advantage of the ram effect of the passage through the air of an aircraft or other vehicle on which the engine is used in increasing the pressure at which air is supplied to the engine and will yet tend to prevent the formation of ice in the parts of the air intake assembly through which air flows to the engine and/or the entry into the engine of particles of water, ice or other foreign matter which may be present in the air stream entering the inlet orifice.

In gas turbines used for jet populsion of aircraft and other vehicles without the use of a propeller the air inlet passage frequently comprises an air inlet orifice of substantially circular cross-section leading directly to an annular air inlet passage of larger external diameter than the air inlet orifice, the centre of the annulus being filled by a bullet-shaped streamlined body. When such a turbine is used in conjunction with a propeller and also where other types of internal combustion engine employing propellers are used, an air inlet of similar form may be employed by the use of a so-called ducted spinner, in which case the central streamlined body surrounds and projects in front of the propeller boss and the rear end of the ducted spinner communicates with a stationary annular continuation of the annular inlet passage in the spinner. The invention is applicable to both types of arrangement referred to above.

An air intake for a combustion turbine or other internal combustion engine according to the present invention comprises an annular air intake passage communicating at its inlet end directly with an air inlet orifice situated directly in front or upstream of the annular air intake passage, said air inlet orifice having a marginal contour which, viewed from up-stream in the direction of air entry, lies wholly within the inner circumference of the annular air inlet passage, and a receptacle for foreign matter situated within the inner circumferential wall of the annular air intake passage and having an inlet opening for foreign matter lying directly behind or down-stream of the air inlet orifice and of at least equal cross-section to the inlet orifice.

In most arrangements the air inlet orifice will be substantially circular in cross-section while the inlet opening to the receptacle will similarly be circular and of somewhat larger diameter than the air inlet orifice.

Further in any case one or more discharge openings or passages preferably lead from a point in the receptacle adjacent to its rear or down-stream end through which a quantity of air can flow continuously or intermittently to carry away with it foreign matter which may tend to collect in the receptacle. The dimensions of the one or more discharge openings or passages may vary according to requirements, but will generally be the minimum necessary to achieve their purpose so that as little as possible of the air entering through the inlet orifice escapes through the receptacle.

The invention may be carried into practice in various ways but one construction according to the invention and a modification thereof are illustrated somewhat diagrammatically by way of example in the accompanying drawing, in which Figure 1 is a diagrammatic side elevation of one construction according to the invention, and Figure 2 is a similar view to Figure 1 showing the modification.

In the constructions illustrated the apparatus comprises an annular air entry, indicated at A, to the axial flow compressor B of a gas turbine system, this annular air entry communicating directly with the rear or down-stream end of an annular air intake passage C formed between inner and outer circumferential walls $C^1$, $C^2$ and extending forwardly up-stream from the entry A to a central circular forwardly facing air intake orifice D.

The air inlet orifice D is of considerably smaller diameter than the outside diameter of the air entry A to the compressor B and of the air inlet passage C and is of somewhat smaller diameter than the internal diameter of the air entry A, the diameter of the inlet orifice D being, in the construction shown, somewhat less than half the external diameter of the air entry A and about two-thirds of the internal diameter of the air entry A.

As will be seen the outer wall $C^2$ of the intake passage C merges at its up-stream end into the wall of the air intake orifice D and the diameter of this wall increases progressively in the downstream direction from the air intake orifice to a part $C^3$ adjacent to the air entry A where it is approximately cylindrical.

The inner wall of the annular air intake passage C terminates at E an appreciable distance behind or down-stream of the air intake orifice D and has a diameter which starts as slightly greater than the diameter of the intake orifice D and increases progressively in the down-stream direction from its forward end to a rear section $C^4$ which is substantially cylindrical.

Formed within and coaxial with the inner circumferential wall $C^1$ is a substantially cylindrical receptacle F, the forward or up-stream end of which is open and is connected directly at E to the forward end of the wall $C^1$ so that this open end lies directly behind and down-stream of the orifice D and has a diameter which is somewhat greater than the diameter of the orifice D.

The rear or down-stream end of the receptacle F is closed by a wall $F^1$ except for a discharge passage G through which a limited flow of air can take place continuously, this passage G passing across the air inlet passage C through the portion $C^3$ of the outer wall thereof and eventually through the wall of a hollow streamlined body H which encloses the turbine system in known manner.

It will be seen that the front or up-stream end of the wall $C^2$ is connected to and conveniently formed continuous with the wall of the hollow streamlined body H customarily surrounding aircraft propulsion engines and which thus extends backwards with respect to the direction of movement thereof outside the air inlet passage C and the compressor B and is spaced therefrom in known manner.

Between the rear or down-stream end of the receptacle F and the front or up-stream end of the compressor B is a space J into which hot air or gas is fed continuously from some suitable part of the power plant, for example from the jet or exhaust pipe, through a series of passages K extending radially across the rear part of the air inlet passage C and communicating at their outer ends with an annular manifold tube $K^1$ to which the hot gas is fed through a pipe $K^2$.

As will be seen the circumferential wall $F^2$ of the receptacle F, the inner and outer walls $C^1$ and $C^2$ of the air intake passage and a forward part $H^1$ of the outer streamlined wall H are formed double with a space between the two layers through which gas can be caused to flow.

In the construction shown in Figure 1 the hot gas delivered into the space J is arranged to flow forwardly with respect to the streamlined body H through the double wall $F^2$ then rearwardly through the double wall $C^1$, the rear end of the gas space in which communicates through a series of radial passages L with the rear end of the space between the two layers of the double wall $C^2$ so that the hot gas flows from the rear end of the double wall $C^1$ through the passages L into the double wall $C^2$, forwardly through this double wall and then rearwardly through the double wall $H^1$ to an annular exit indicated at $H^2$.

Heat is thereby conducted to the double walls in question by the hot gas.

In the alternative construction shown in Figure 2 hot gas flows from the space J forwardly through the double wall $F^2$, then rearwardly through the double wall $C^1$ to exits M in the air intake passage C. In addition hot gas flows directly from the space J through a series of radial passages $L^1$, somewhat resembling the passages L in Figure 1, into the rear end of the double wall $C^2$ from which the hot gas flows forwardly through the double wall $C^2$ then rearwardly through the double wall $H^1$ and through the exits $H^2$.

It will be seen that in each of the constructions illustrated the air entering the air inlet orifice D will, immediately after entry, be deflected radially outwards in order to enter the annular air inlet passage C, while heavy particles, for example of water or solid foreign matter, will be carried by their momentum into the receptacle F so that the air entering the turbine through the inlet A tends to be substantially free from water or solid particles. Any water or solid particles received by the receptacle F will tend to be fed away continuously through the passage G into the atmosphere surrounding the streamlined body H.

In addition, under idling conditions, or at all times, the feeding of hot gas through the pipe $K^2$ into the space J and thence through the double walls as described above will result in heat being continuously supplied to the walls $F^1$ and $F^2$ of the receptacle F, the wall of the air inlet orifice D and the walls $C^1$, $C^2$ of the air inlet passage C and the forward part $H^1$ of the streamlined body H, thus assisting in the prevention of ice accumulation on these parts. Moreover under icing conditions, ice particles entering or tending to form in the receptacle F will be melted and drained away as water through the passage G.

In some cases means may be provided for controlling the passage G so that instead of being open continuously it can be opened intermittently to permit escape of matter which may have accumulated in the receptacle F.

What I claim as my invention and desire to secure by Letters Patent is:

1. An air intake assembly for a gas turbine system comprising an air intake orifice, an annular air intake passage having inner and outer circummerential walls and lying wholly downstream of said orifice in relation to the direction of flow of air through said orifice and with its inlet end facing generally upstream in relation to the direction of flow of air through said orifice, and communicating at its inlet end directly with said orifice, the marginal contour of said orifice lying wholly within the circumference of said inner circumferential wall of said annular passage when viewed in the direction of air flow through said orifice, and a receptacle for foreign matter situated within the said inner circumferential wall of said air intake passage, with an inlet opening situated on the upstream side of the receptacle and directly downstream of and facing said air intake orifice so as to catch foreign matter entering the orifice.

2. An air inlet assembly as claimed in claim 1, in which the air intake orifice is approximately circular in cross-section and has a diameter which is less than the diameter of the inlet opening into the receptacle for foreign matter.

3. An air intake assembly as claimed in claim 2, in which said receptacle for foreign matter is provided with an outlet passage leading from it adjacent to its downstream end through which flow can take place so as to enable foreign matter which may accumulate in the receptacle to be discharged.

4. An air intake assembly as claimed in claim 3 in which the receptacle is surrounded at least partially by a heating space and means are provided for feeding hot gas continuously through said space from a part of the gas turbine system.

5. An air intake assembly as claimed in claim 4, in which said receptacle comprises double circumferential walls forming an annular surrounding enclosed space, and said inner circumferential wall of said annular air intake passage similarly comprises double circumferential walls forming a second annular enclosed space, communicating directly with the first enclosed space adjacent the rim of the inlet opening of said receptacle, and comprising means for continuously delivering hot gas from a part of said gas turbine system to said annular enclosed spaces.

6. An air inlet assembly as claimed in claim 1, in which said receptacle for foreign matter is provided with an outlet passage leading from it adjacent to its downstream end through which flow can take place to enable foreign matter which may accumulate in the receptacle to be discharged.

7. An air inlet assembly as claimed in claim 1, in which the wall of the receptacle is surrounded at least partially by a heating space and means are provided for feeding hot gas continuously through said space from a part of the gas turbine system.

JOHN KINSELLA.

REFERENCES CITED

The following references are of record in the file of this patent:

UNITED STATES PATENTS

| Number | Name | Date |
|---|---|---|
| 1,544,271 | Nelson | June 30, 1925 |
| 1,774,301 | Terry | Aug. 26, 1930 |
| 2,474,068 | Sammons | June 21, 1949 |

FOREIGN PATENTS

| Number | Country | Date |
|---|---|---|
| 871,408 | France | Jan. 15, 1942 |